US011312232B2

(12) United States Patent
Willyard

(10) Patent No.: US 11,312,232 B2
(45) Date of Patent: Apr. 26, 2022

(54) CENTER BEARING ASSEMBLY INCLUDING A ROTATABLE WELD COLLAR WITH A TUNED DAMPER

(71) Applicant: Neapco Intellectual Property Holdings, LLC, Farmington Hills, MI (US)

(72) Inventor: John Willyard, Farmington Hills, MI (US)

(73) Assignee: NEAPCO INTELLECTUAL PROPERTY HOLDINGS, LLC, Farmington Hills, MI (US)

(*) Notice: Subject to any disclaimer, the term of this patent is extended or adjusted under 35 U.S.C. 154(b) by 295 days.

(21) Appl. No.: 16/663,418

(22) Filed: Oct. 25, 2019

(65) Prior Publication Data
US 2020/0055392 A1 Feb. 20, 2020

Related U.S. Application Data

(63) Continuation of application No. 16/449,690, filed on Jun. 24, 2019.

(60) Provisional application No. 62/690,495, filed on Jun. 27, 2018.

(51) Int. Cl.
| B60K 17/22 | (2006.01) |
| F16D 3/223 | (2011.01) |
| F16C 27/06 | (2006.01) |
| F16F 15/32 | (2006.01) |
| F16F 15/14 | (2006.01) |

(52) U.S. Cl.
CPC ............ *B60K 17/22* (2013.01); *F16C 27/066* (2013.01); *F16D 3/223* (2013.01); *F16F 15/1442* (2013.01); *F16F 15/322* (2013.01); *F16C 2326/06* (2013.01); *F16D 2003/22326* (2013.01); *Y10S 464/906* (2013.01); *Y10T 74/2131* (2015.01)

(58) Field of Classification Search
CPC .... B60K 17/22; F16C 27/066; F16C 2326/06; F16D 3/223; F16D 2003/22326; F16F 15/1442; F16F 15/322; Y10S 464/906; Y10T 74/2131
USPC .......................................................... 464/180
See application file for complete search history.

(56) References Cited

U.S. PATENT DOCUMENTS

| 4,943,263 A * | 7/1990 | Zyogahara .......... F16F 15/3153 |
| | | 464/180 |
| 7,600,601 B2 | 10/2009 | Lin et al. |
| 9,670,964 B1 | 6/2017 | Burnard et al. |

FOREIGN PATENT DOCUMENTS

JP 4-73423 A * 3/1992 .................... 464/180

* cited by examiner

*Primary Examiner* — Greg Binda
(74) *Attorney, Agent, or Firm* — Dickinson Wright PLLC

(57) ABSTRACT

A constant velocity joint for a multi-piece propeller shaft includes an outer race extending from a first outer race end to a second outer race end to define an exterior surface. A tuned damper extends radially outwardly from the exterior surface of the of the outer race for reducing noise, vibration, and/or harshness (NVH) generated during operation of the multi-piece propeller shaft.

12 Claims, 12 Drawing Sheets

CENTER BEARING ASSEMBLY INCLUDING A ROTATABLE WELD COLLAR WITH A TUNED DAMPER

CROSS-REFERENCE TO RELATED APPLICATION

The subject application is a continuation of U.S. application Ser. No. 16/449,690 filed on Jun. 24, 2019, which claims the benefit of U.S. Provisional Application Ser. No. 62/690,495 filed on Jun. 27, 2018, the entire disclosures of which are incorporated herein by reference.

BACKGROUND OF THE INVENTION

1. Field of the Invention

The present disclosure relates generally to multi-piece propeller shafts. More particularly, the present disclosure relates to a tuned damper for a multi-piece propeller shaft.

2. Related Art

This section of the written disclosure provides background information related to propeller shafts and center bearing assemblies which is not necessarily prior art to the inventive concepts disclosed and claimed in this application.

Technological advancements continue to improve the performance of automobiles, including the reduction of noise and vibration due to rotational components, such as driveline components. Dampers, such as tuned dampers (e.g., to dampen torsional, radial, and/or axial vibrations), are used on automobile driveline components, such as, but not limited to, propeller shafts to reduce noise and/or vibration that may occur during operation of the automobile driveline. Tuned dampers may be disposed at various locations on propeller shafts due to a number of factors, such as clearance of other surrounding driveline components throughout the operational range of the automobile. Some propeller shafts are configured in more than one piece (i.e., multi-piece), due to driveline configurations, among other reasons. These multi-piece propeller shafts, particularly when utilized in truck applications, are often configured with a tuned damper located near a center bearing assembly of the driveline.

With reference to FIG. 2, one such prior art application includes integrating a tuned damper into a stud yoke of the center bearing assembly. However, this design concept results in a stud yoke that is heavy and costly, namely because the forging process required to modify the stud yoke to accept the tuned damper results in a heavy and costly part. In other words, the steel forging process requirements to integrate a tuned damper into the stud yoke result in a large, heavy steel body for this component. As a result of the increase in rotational mass of the stud yoke with the integrated damper, the cost of the combined tuned damper/stud yoke is increased and performance may be negatively affected. This configuration can also be welded together, making selective installation (i.e., optional tuned damper), depending on driveline configuration difficult. Accordingly, there remains an on-going and continuing need for a center bearing assembly with a tuned damper that provides improved noise and vibration reduction as well as reduced cost and improved ease of assembly (i.e., manufacturing feasibility) for the center bearing assembly.

SUMMARY OF THE INVENTION

This section provides a general summary of the inventive concepts associated with this disclosure and is not intended to be interpreted as a complete and comprehensive listing of all of its aspects, objectives, features and advantages.

It is an aspect of the present disclosure to provide a center bearing assembly including a tuned damper mounted on a rotatable weld collar. It is also an aspect of the present disclosure to provide a rotatable weld collar including a tuned damper, for later incorporation into the center bearing assembly during its manufacture. It is also an aspect of the present disclosure to provide a multi-piece propeller shaft including a center bearing assembly with a tuned damper mounted on a rotatable weld collar.

More specifically, according to one aspect of the present invention, a center bearing assembly for a multi-piece propeller shaft includes a stud yoke extending along an axis from a first stud yoke end to a second stud yoke end to define a central stub shaft rotatable about the axis. A rotatable weld collar is operably connected to the second stud yoke end of the central stub shaft for simultaneous rotation therewith. The rotatable weld collar includes a body extending from a first collar end disposed adjacent the central stub shaft to a second collar end to define an exterior surface. A tuned damper extends radially outwardly from the rotatable collar for reducing noise, vibration, and/or harshness (NVH) generated during operation of the multi-piece propeller shaft.

According to another aspect of the present invention, a rotatable weld collar for a center bearing assembly includes a body extending from a first collar end to a second collar end to define an exterior surface. A tuned damper extends radially outwardly from the exterior surface for reducing noise, vibration, and/or harshness (NVH) generated during operation of the center bearing assembly.

According to another aspect of the present invention, a multi-piece propeller shaft includes a first shaft segment and a second shaft segment. A center bearing assembly is disposed between and operably interconnected with the first shaft segment and the second shaft for rotatably supporting the propeller shaft and transferring a rotational force of the first shaft segment to the second shaft segment. The center bearing assembly includes a stud yoke extending from a first stud yoke end operably connected to the second shaft segment to a second stud yoke end to define a central stub shaft extending along a rotational axis. A rotatable weld collar is operably connected to the central stub shaft to allow for simultaneous rotation of the rotatable weld collar and the stud yoke. The rotatable weld collar includes a body extending from a first collar end disposed adjacent the central stub shaft to a second collar end operably connected to the first shaft segment to define an exterior surface. A tuned damper extends radially outwardly from the exterior surface of the rotatable weld collar for reducing noise, vibration, and/or harshness (NVH) generated during operation of the multi-piece propeller shaft.

In each arrangement, the incorporation of the tuned damper into the rotatable weld collar provides a reduced weight and cost of the stud yoke, related to the prior art designs that integrate the tuned damper into the stud yoke (See, e.g. FIG. 2). Further, installation of the tuned damper on the rotatable weld collar leads to simplification in manufacturing of center bearing assemblies and multi-piece propeller shafts that require tuned dampers.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Exemplary embodiments will now be described more fully with reference to the accompanying drawings. In particular, a number of non-limiting embodiments of automobile driveline components with improved tuned dampers are provided so that this disclosure will be thorough and will fully convey the true and intended scope to those who are skilled in the art. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. It should also be appreciated that the present invention can be utilized in connection with other types of automobile components not described fully herein.

Figure 1:
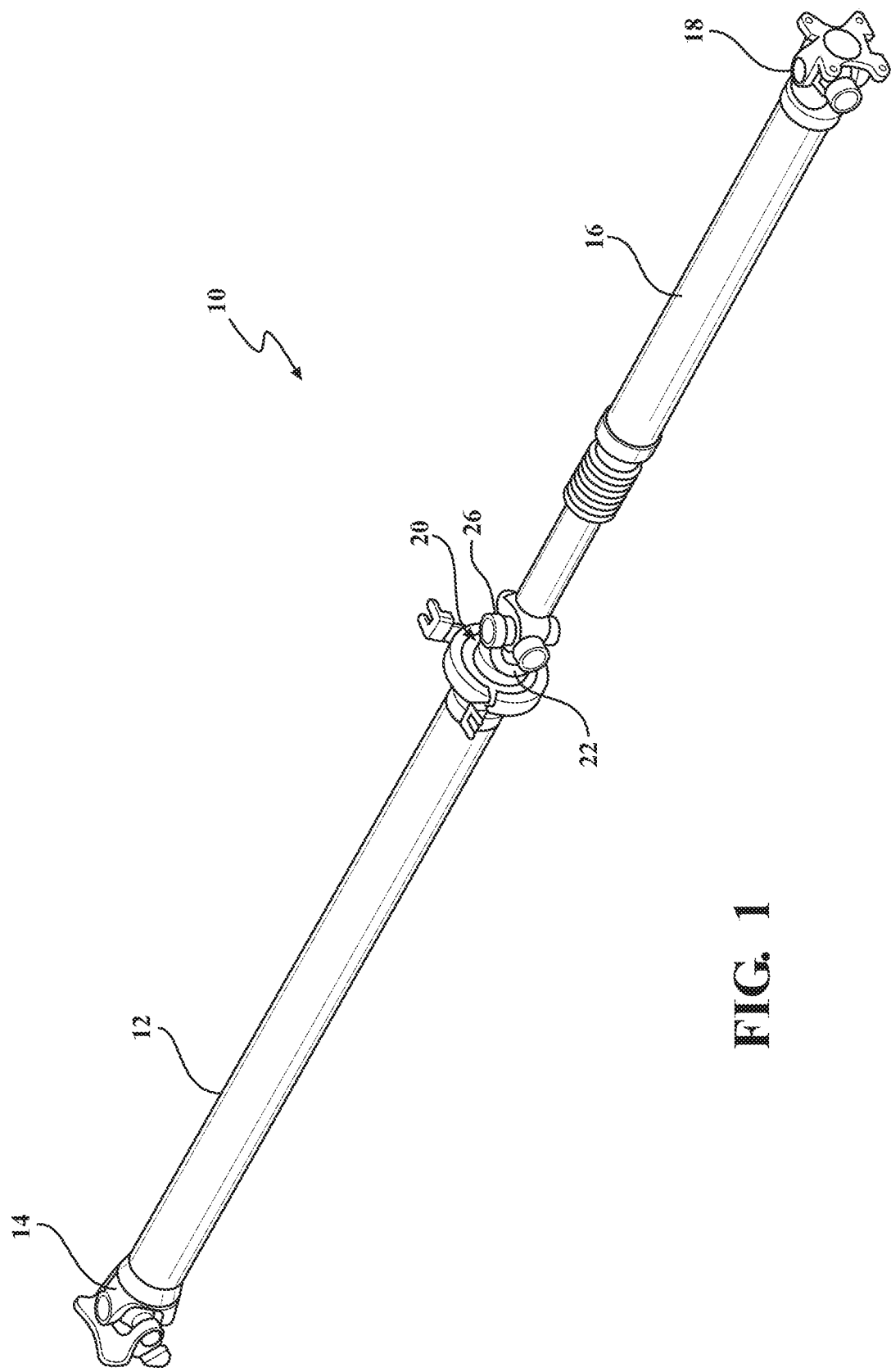
FIG. 1 is a perspective view of a multi-piece propeller shaft illustrating a center bearing assembly operably connecting a first shaft segment and a second shaft segment.

With reference to FIG. 1, a center bearing assembly in accordance with the subject disclosure is employed on an automobile driveline component such as a propeller shaft or other rotational component. For example, the automobile components could be propeller shafts, drive shafts, half shafts, axles, transfer cases, power takeoff ("PTO") units, and/or other components that operate to transmit rotational forces (i.e., rotational energy), between and/or through one or more other automobile driveline components. However, as illustrated in FIG. 1, the propeller shaft is most preferably a multi-piece propeller shaft 10 that includes a first shaft segment 12 having a first universal joint 14 for coupling to a vehicle's transmission (not shown) and a second shaft segment 16 having a second universal joint 18 for coupling to a vehicle's differential (not shown). A center bearing assembly 20 is disposed between and operably interconnects the first shaft segment 12 with the second shaft segment 16 for rotatably supporting the propeller shaft 10 and transferring a rotational force of the first shaft segment 12 to the second shaft segment 16.

As best illustrated in FIGS. 1-4 and 6, the center bearing assembly 20 includes a stud yoke 22 extending from a first stud yoke end 24 operably connected to the second shaft segment 16, such as via a third universal joint 26, to a second stud yoke end 28 to define a central stub shaft 30 extending along a rotational axis A. A bearing sleeve 32 is disposed in surrounding and concentric relationship with the central stub shaft 30 and includes a ball bearing 34 disposed in rotatably supporting relationship with the central stub shaft 30 for allowing rotation of the central stub shaft 28 about the rotational axis A.

Figure 3:
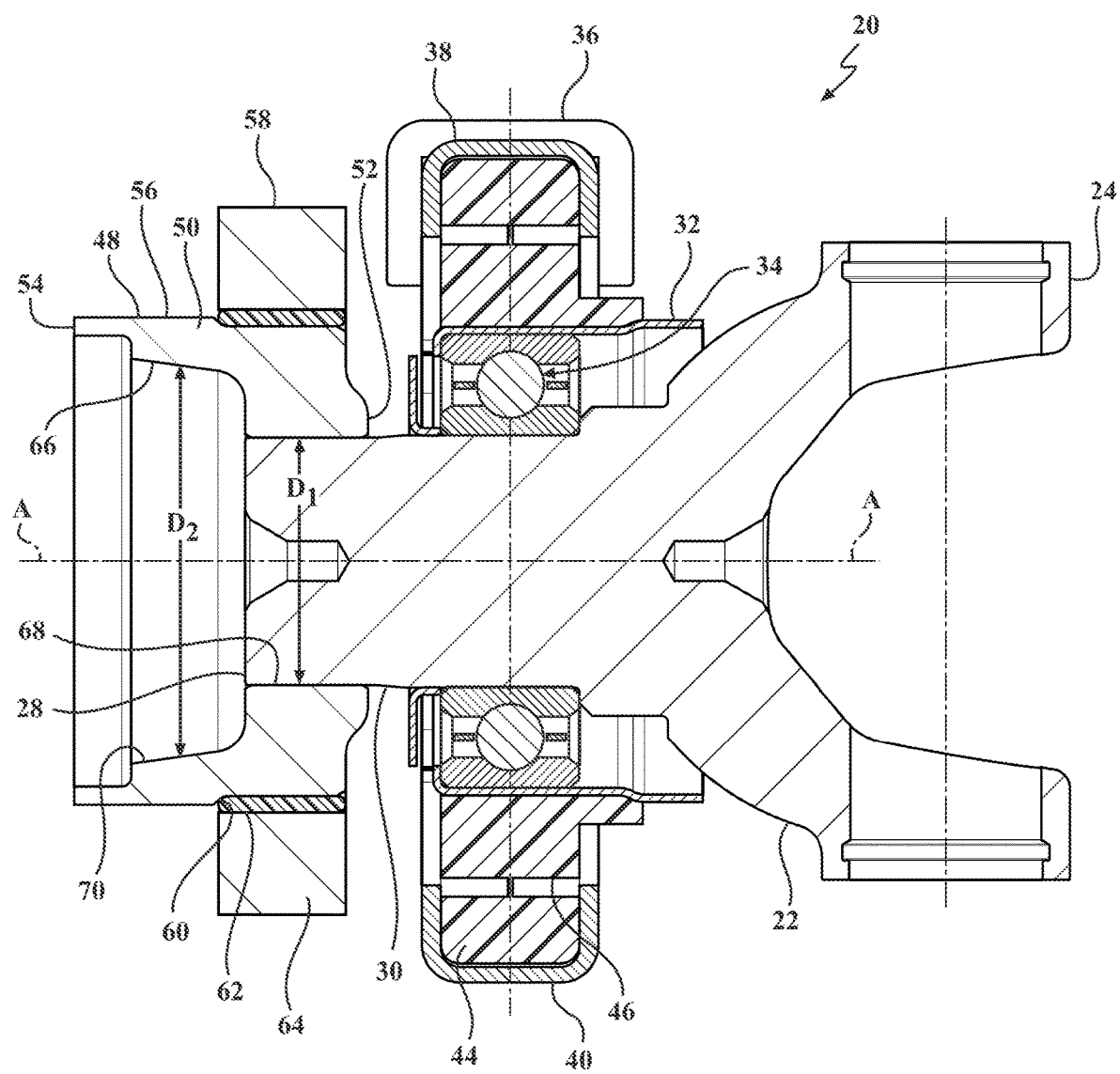
FIG. 3 is a cross-sectional view of a center bearing assembly in accordance with an aspect of the subject disclosure and illustrating a tuned damper disposed on a rotatable weld collar.
Figure 4:
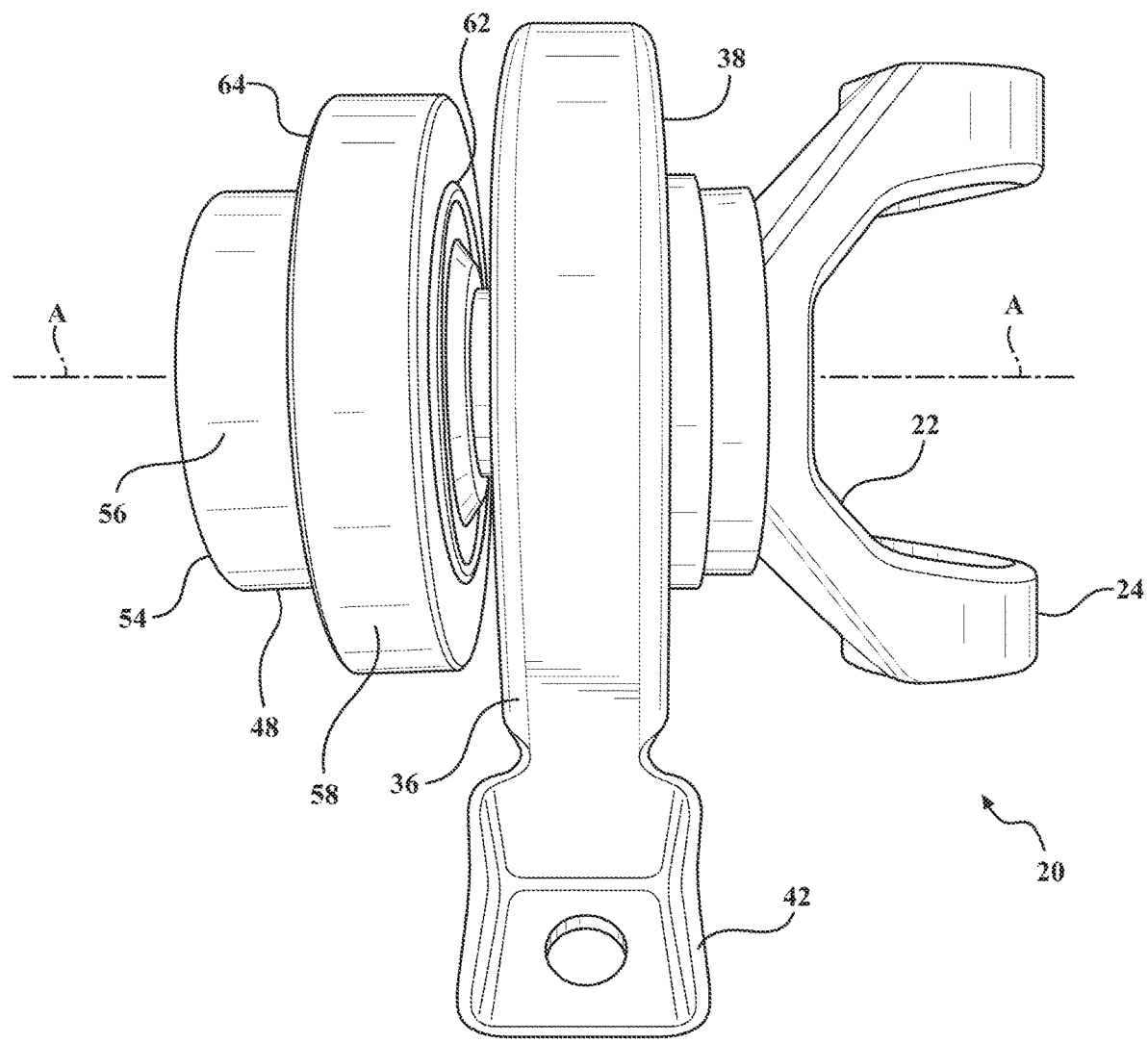
FIG. 4 is a side, perspective view of the center bearing assembly.
Figure 5:
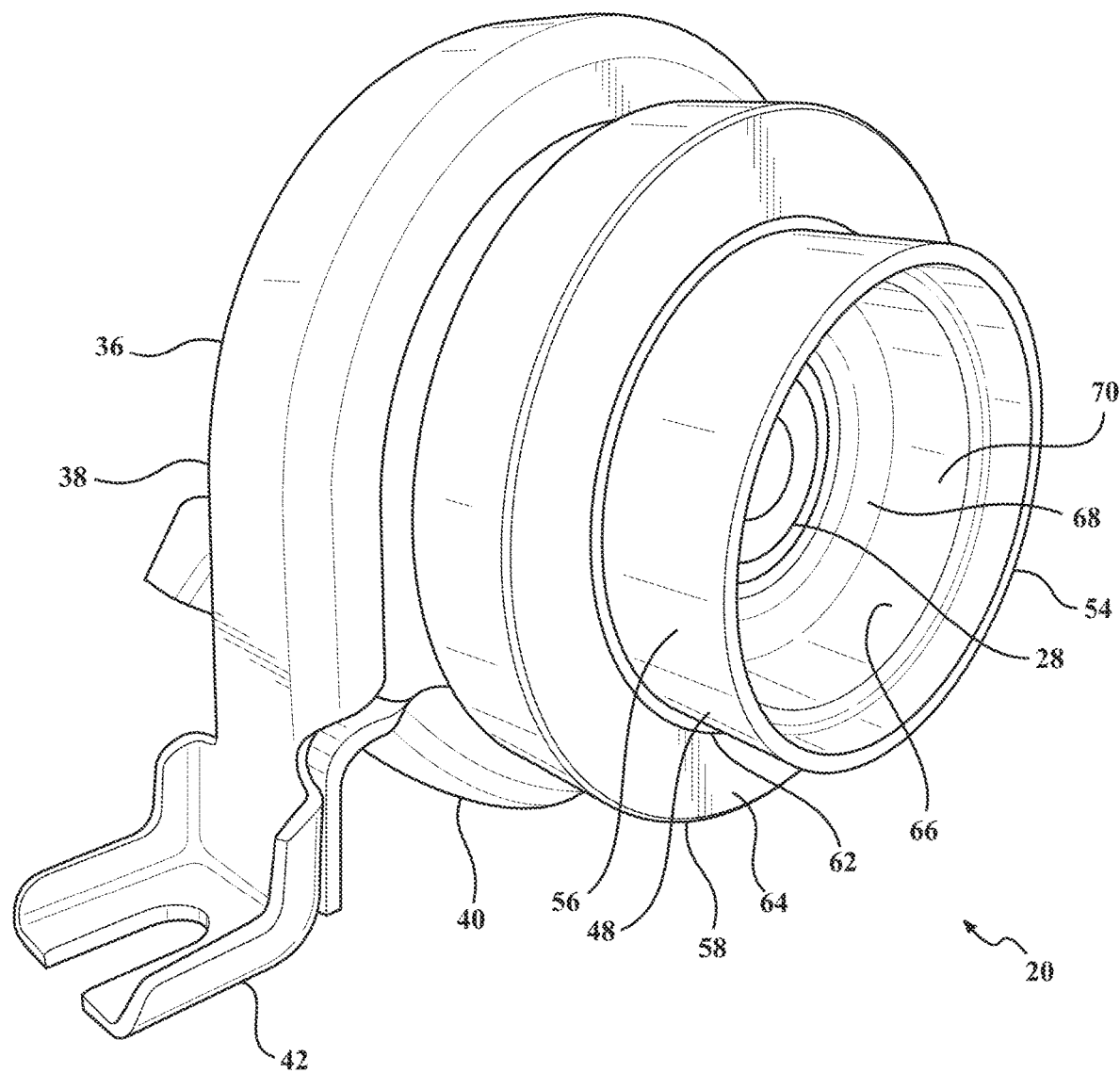
FIG. 5 is an end, perspective view of the center bearing assembly illustrating the tuned damper extending radially outwardly from an exterior surface of the rotatable weld collar.
Figure 6:
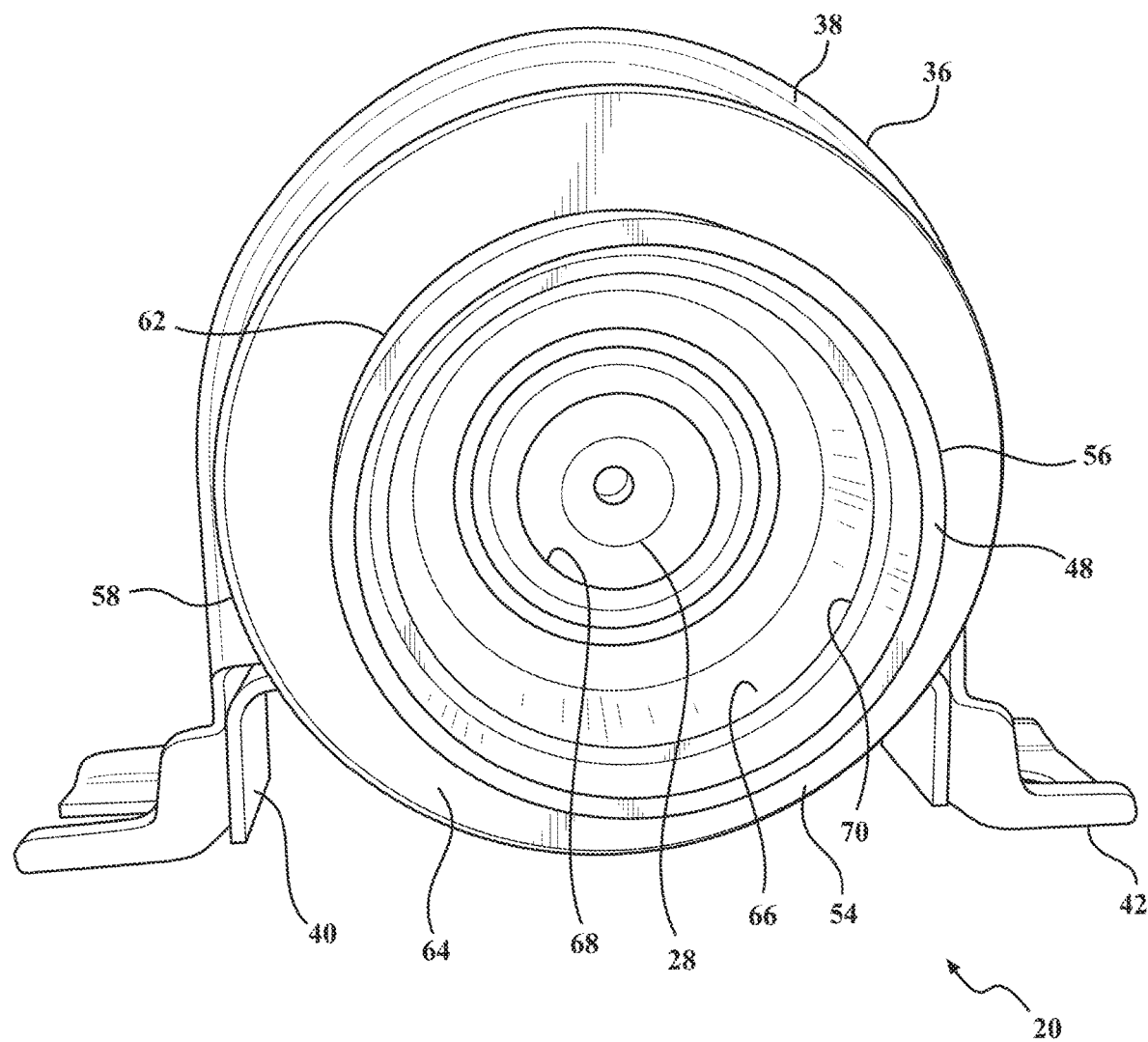
FIG. 6 is a first end view illustrating a bore defined by the rotatable weld collar.
Figure 7:
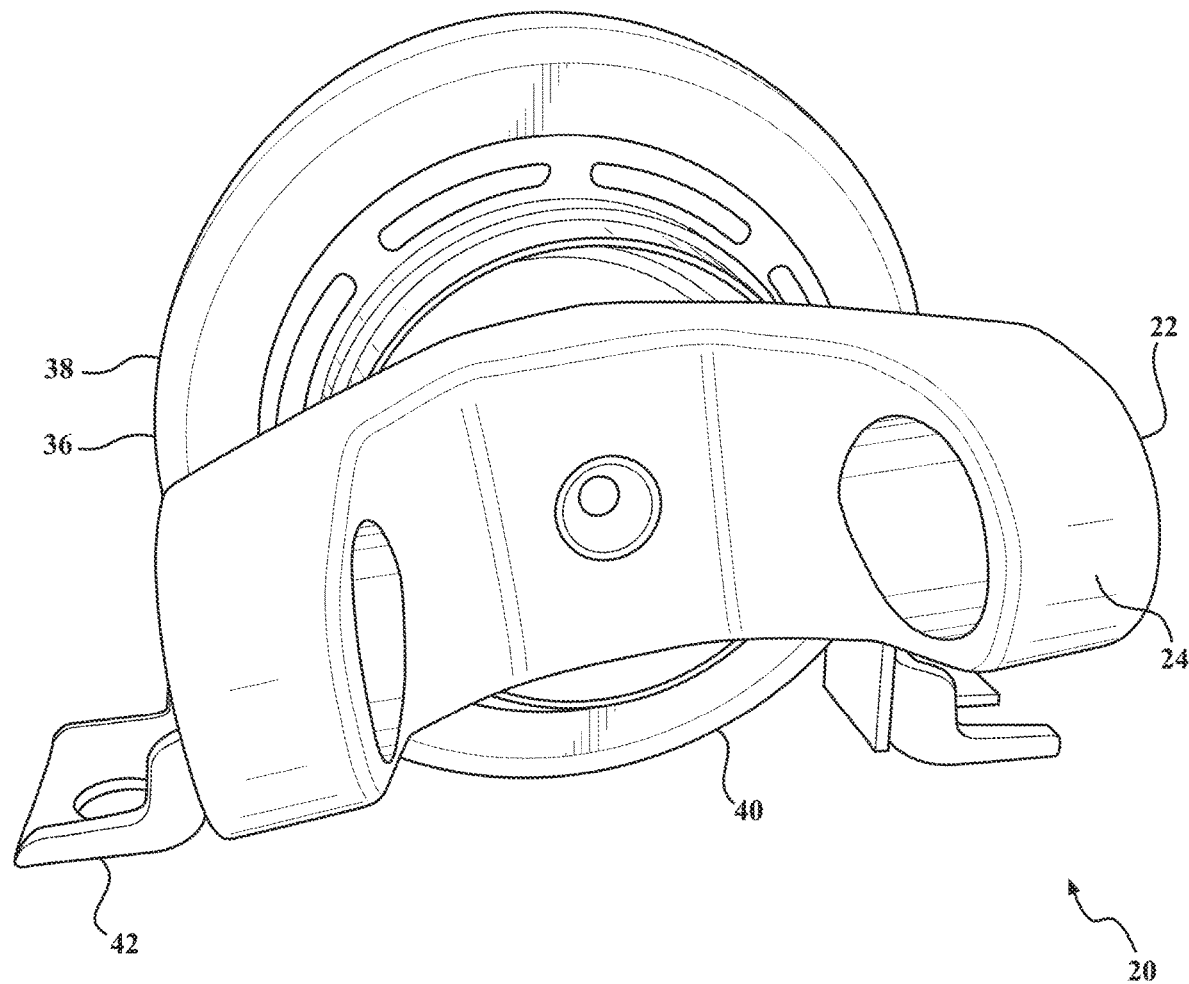
FIG. 7 is a second end view of the center bearing assembly illustrating a stud yoke.

As best illustrated in FIGS. 3-7, a housing 36 supports and covers the bearing sleeve 32 and includes an upper bracket 38 and a lower bracket 40 interconnected to one another, such as via fasteners, welding, or the like, to dispose the brackets 38, 40 in surrounding relationship with the ball bearing 34. As best illustrated in FIGS. 4-6, at least one of the brackets 38, 40 includes a flange 42 for facilitating attachment of the housing 36 to a portion of the vehicle, such as a vehicle frame, to provide a supporting structure for the center bearing assembly 20 when the multi-piece propeller shaft 10 is installed within the vehicle. As further illustrated in FIG. 3, a ball bearing isolator 44 comprised of an elastomer and/or other suitable material is disposed between the housing 36 and the bearing sleeve 32, and defines a plurality of isolator voids 46 to allow for movement of the ball bearing 34 through several axes during rotation of the central stub shaft 28.

As best illustrated in FIG. 3, a rotatable weld collar 48 is operably connected to the second stud yoke end 28, such as via friction or laser welding, to allow for simultaneous rotation of the rotatable weld collar 48 and the stud yoke 22. The rotatable weld collar 48 includes a body 50 extending from a first collar end 52 for interconnection with the central stub shaft 30 to a second collar end 54 for interconnection with the first shaft segment 12. The body 50 defines an exterior surface 56 extending between the first and second collar ends 52, 54. A tuned damper 58 extends radially outwardly from the exterior surface 56 of the rotatable weld collar 48 for reducing, cancelling or counteracting noise, vibration, and/or harshness (NVH) generated during operation of the center bearing assembly 20, namely simultaneous rotation of the weld collar 48 and the stud yoke 22 and their corresponding shaft segments 12, 16. In a preferred arrangement, the tuned damper 58 is installed on the rotating weld collar 48 by press fitting the tuned damper 58 on the exterior surface 56. However, the tuned damper 58 can also be adhesively secured to the exterior surface 56 of the rotating weld collar 48 without departing from the scope of the subject disclosure.

Figure 2:
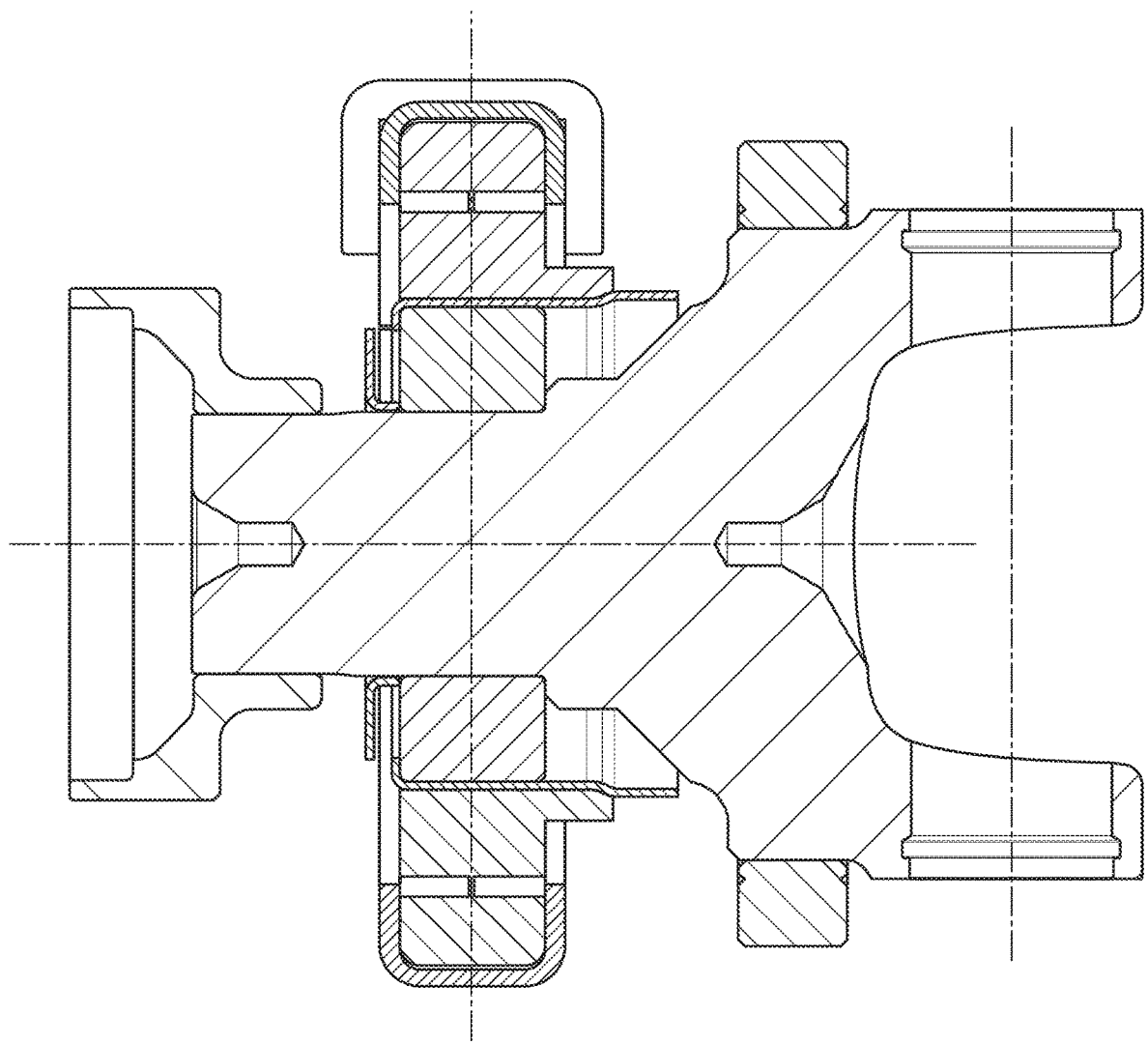
FIG. 2 is a cross-sectional view of a prior art center bearing assembly including a tuned damper integrated into a stud yoke.

Placement of the tuned damper 58 on the rotatable weld collar 48 advantageously allows the use of a significantly lighter and slimmer stud yoke 22, relative to the prior art designs which required integration of the tuned damper into the stud yoke 22, such as illustrated in FIG. 2. In other words, the incorporation of the tuned damper 58 on the rotatable weld collar 48 leads to a center bearing assembly 20 with a stud yoke 22 greatly reduced in mass and size, thus reducing the amount of raw material used, and reducing the complexity of post-forging machining operations for the center bearing assembly 20. Thus, the simplicity of the subject design, which incorporates the tuned damper 58 on the rotatable weld collar 48, provides many performance, cost, and weight reduction benefits for the center bearing assembly 20.

As best illustrated in FIGS. 3-5 the tuned damper 58 is disposed adjacent the first collar end 52 and in spaced relationship with the second collar end 54 to provide a portion of the exterior surface 56 which remains exposed to facilitate attachment of the first shaft segment 12 to the second collar end 54 of the rotatable weld collar 48, such as via a friction or laser welding manufacturing process. The exterior surface 56 of the rotatable weld collar 48 defines a lip 60 disposed between the first and second collar ends 52, 54 for guiding and securing placement of the tuned damper 58 between the lip 60 and the first collar end 52.

Figure 8:
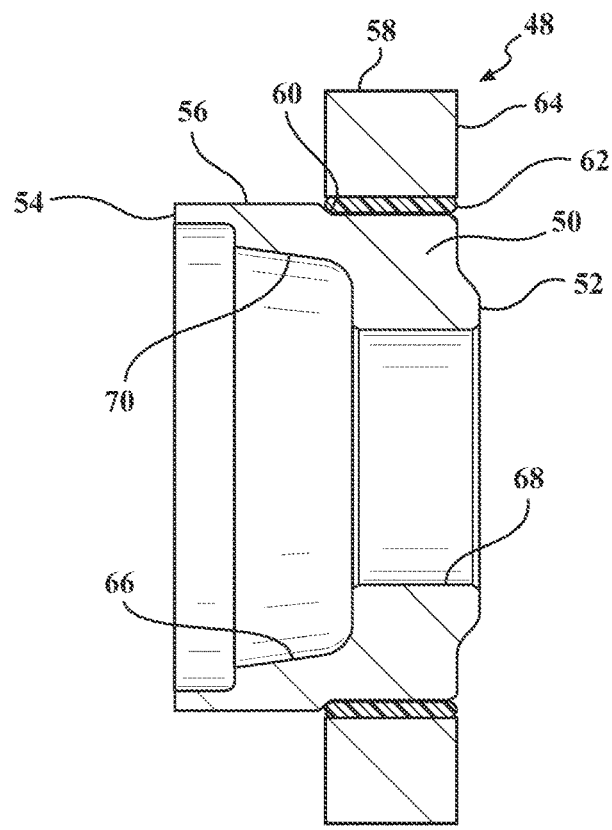
FIG. 8 is a cross-sectional view of the rotatable weld collar including the tuned damper for use in later manufacturing a center bearing assembly.

As best illustrated in FIGS. 3 and 8, in a preferred arrangement, the tuned damper 58 includes a first damper ring 62 and a second damper ring 64. The first damper ring 62 is disposed in encircling and abutting relationship with the exterior surface 56 of the rotatable weld collar 48 and is comprised of a flexible material, such as plastic, synthetic or natural rubber, or elastomer material. The second damper ring 64 is disposed in encircling and abutting relationship with the first damper ring 62 and is comprised of a lightweight steel or iron material. Due to the flexible configuration of the first damper ring 62, it may be disposed via an interference fit between the exterior surface 56 of the rotatable weld collar 48 and the second damper ring 64. The size and weight of both the first damper ring 62 and the second damper ring 64 are selectively chosen based on the frequency of vibration present at the center bearing assembly 20 from the multi-piece propeller shaft 10. In other words, depending on the type, amount and/or magnitude of the offensive and/or unwanted NVH that is being reduced and/or cancelled, a mass and/or material of the first and second damper rings 62, 64 can be changed to correspond with the desired performance of the tuned damper 58.

Figure 9:
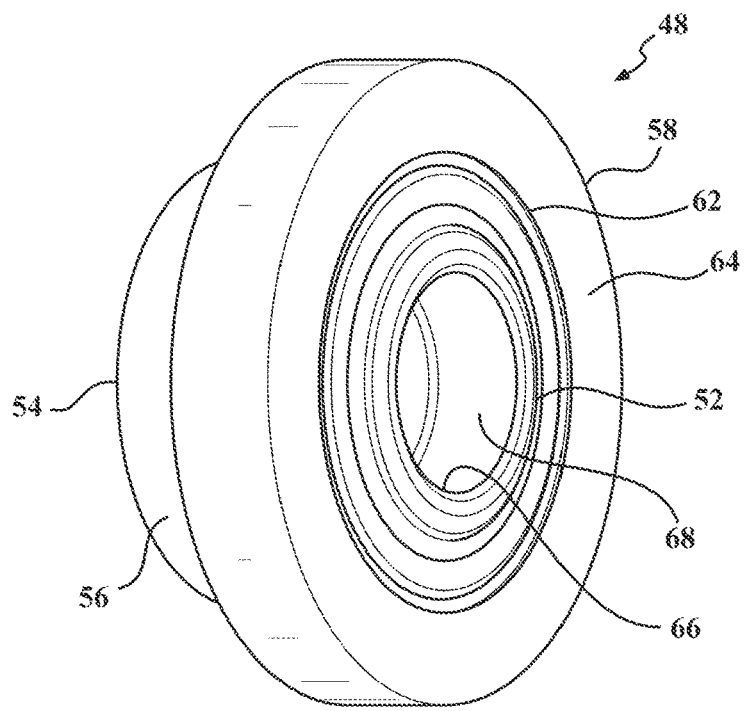
FIG. 9 is a perspective view of the rotatable weld collar illustrating the tuned damper extending radially outwardly from the exterior surface.

Placement of the tuned damper 58 on the rotatable weld collar 48 additionally improves manufacturing and flexibility of center bearing assemblies 20 which incorporate tuned dampers. For example, as best shown in FIGS. 8-9, a rotatable weld collar 48 which includes or incorporates a tuned damper 58 can be manufactured as a separate component and prior to its interconnection to the stud yoke 22 of the center bearing assembly 20. In other words, the subject disclosure is also directed to a rotatable weld collar 48 which includes a tuned damper 58 for later incorporation onto a stud yoke 22 during manufacturing of a center bearing assembly 20. The manufacture and installation of the tuned damper 58 to the rotatable weld collar 48 as a separate component is advantageous because it can be completed at a remote manufacturing location. Thus, the subject design only requires transportation of the rotatable weld collar 48 between manufacturing sites to manufacture the center bearing assembly 20, and not the large and heavy stud yoke 22, and/or other components of the center bearing assembly 20 which require transportation during manufacture of the prior art designs. Additionally, rotatable weld collars 48 with tuned dampers 58 can be easily stored at a manufacturing site of the center bearing assemblies 20 and multi-piece propeller shafts 10, and installed only as needed, simplifying component complexity, as well as storage and supply of center bearing assemblies 20 with tuned dampers 58. Additionally, rotatable weld collars 48 with varying performance characteristics of the tuned damper 48 can be manufactured in advance and later incorporated into the center bearing assembly 20 depending on the intended application of the multi-piece propeller shaft 10, which improves manufacturing flexibility and lowers the cost of tuning complexity and logistics.

As best illustrated in FIGS. 3 and 8, the body 50 of the rotatable weld collar 48 defines a bore 66 extending from first collar end 52 to the second collar end 54. The bore 66 includes an annular portion 68 disposed adjacent the first collar end 52 having a first diameter $D_1$ sized complementary to the central stub shaft 30 to position the annular portion 68 in abutting and encircling relationship with the second stud yoke end 28 of the stud yoke 22. The bore includes a cup-shaped portion 70 having a second diameter $D_2$ incrementally increasing in size from the first annular portion 68 to the second collar end 54 for receiving the first shaft segment 12. During assembly of the multi-piece propeller shaft 10, the first shaft segment 12 is abutted to the second collar end 54 and is operably connected to the second collar end 54 of the rotatable weld collar 48, such as via friction or laser welding. Placement of the tuned damper 58 adjacent the first collar end 52 advantageously provides sufficient space at the second collar end 54 to facilitate this friction or laser welding process.

In accordance with another aspect of the present disclosure, a multi-piece propeller shaft 10 includes a tuned damper mounted on an outer race of a constant velocity joint. More specifically, with reference to FIGS. 10-11, a constant velocity joint 72 is operably connected to the second shaft segment 16 to transmit torques at various speeds, angles and telescopic positions between the first shaft segment 12 and the second shaft segment 16. As best illustrated in FIG. 12, the constant velocity joint 72 includes a constant velocity (CV) shaft 74 extending from a first CV shaft end operably connected with the first shaft segment 12 to a second CV shaft end operably connected to an inner race 80. For example, the inner race 80 can define a plurality of grooves 82 for mating with a plurality of splines (not expressly shown) disposed on the second CV shaft end 78.

Figure 10:
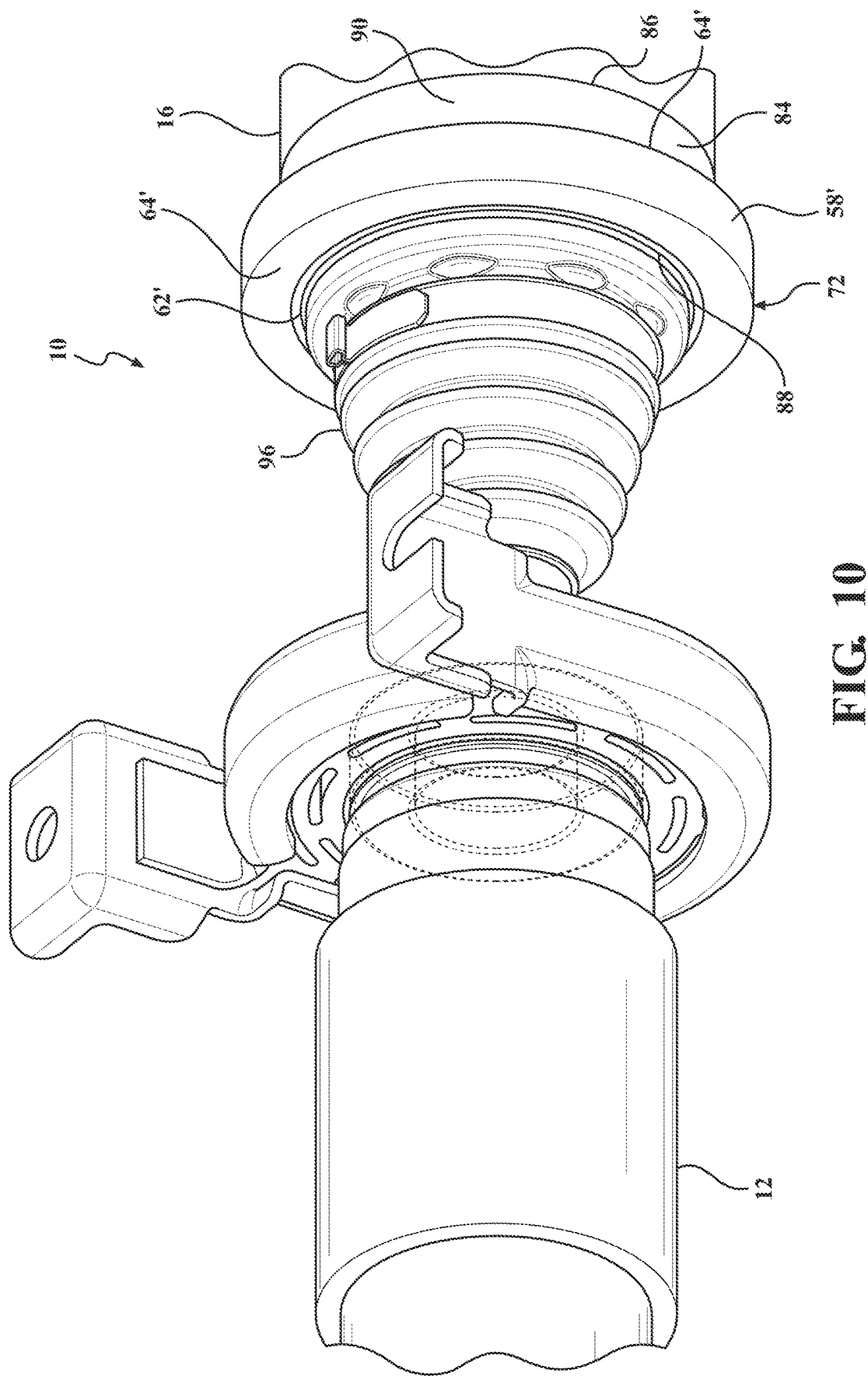
FIG. 10 is a fragmentary, perspective view of a multi-piece propeller shaft including a constant velocity joint operably connecting a first shaft segment and a second shaft segment.
Figure 11:
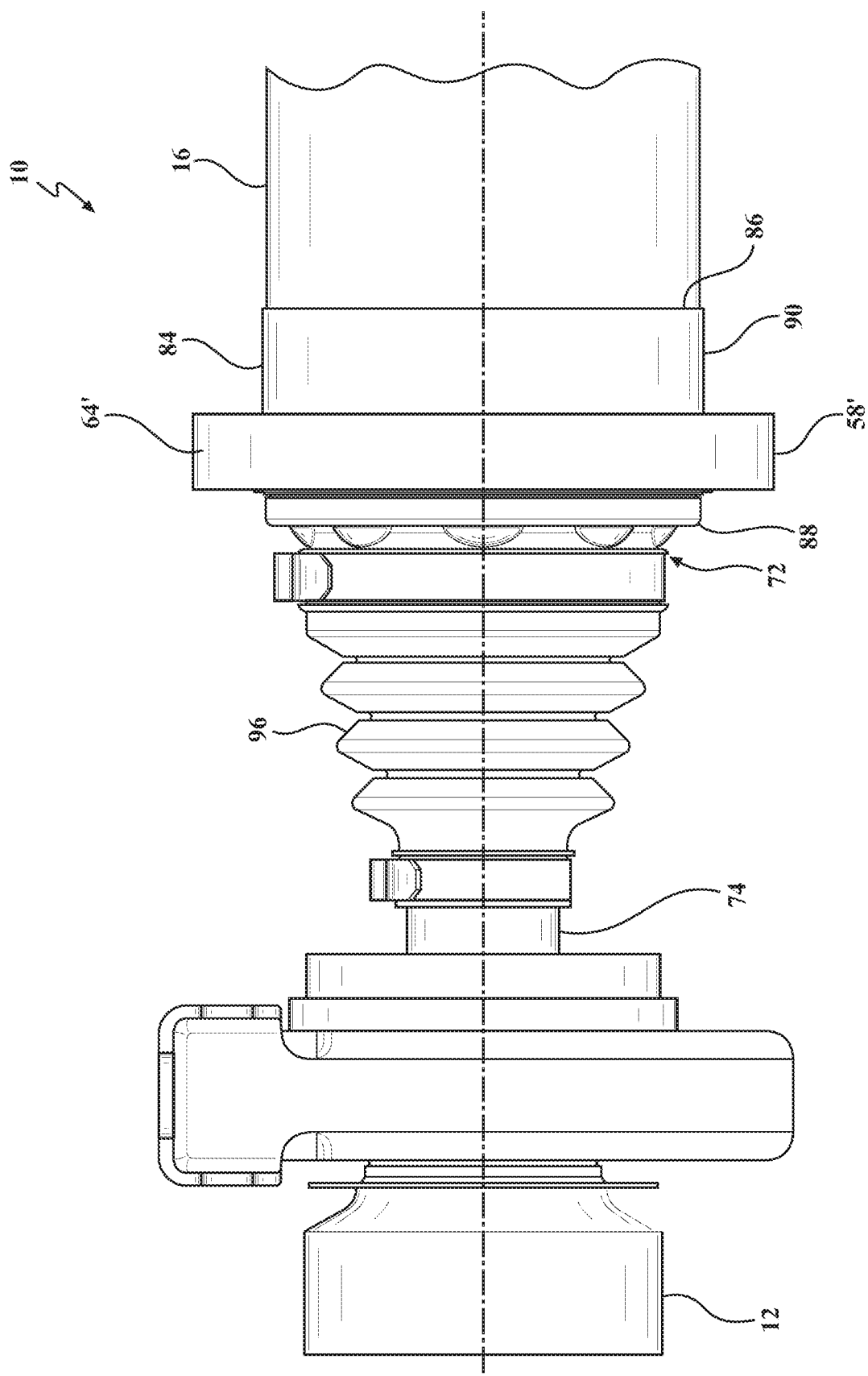
FIG. 11 is a fragmentary, side perspective view of the multi-piece propeller shaft illustrating a tuned damper extending radially outwardly from an exterior surface of an outer race.
Figure 12:
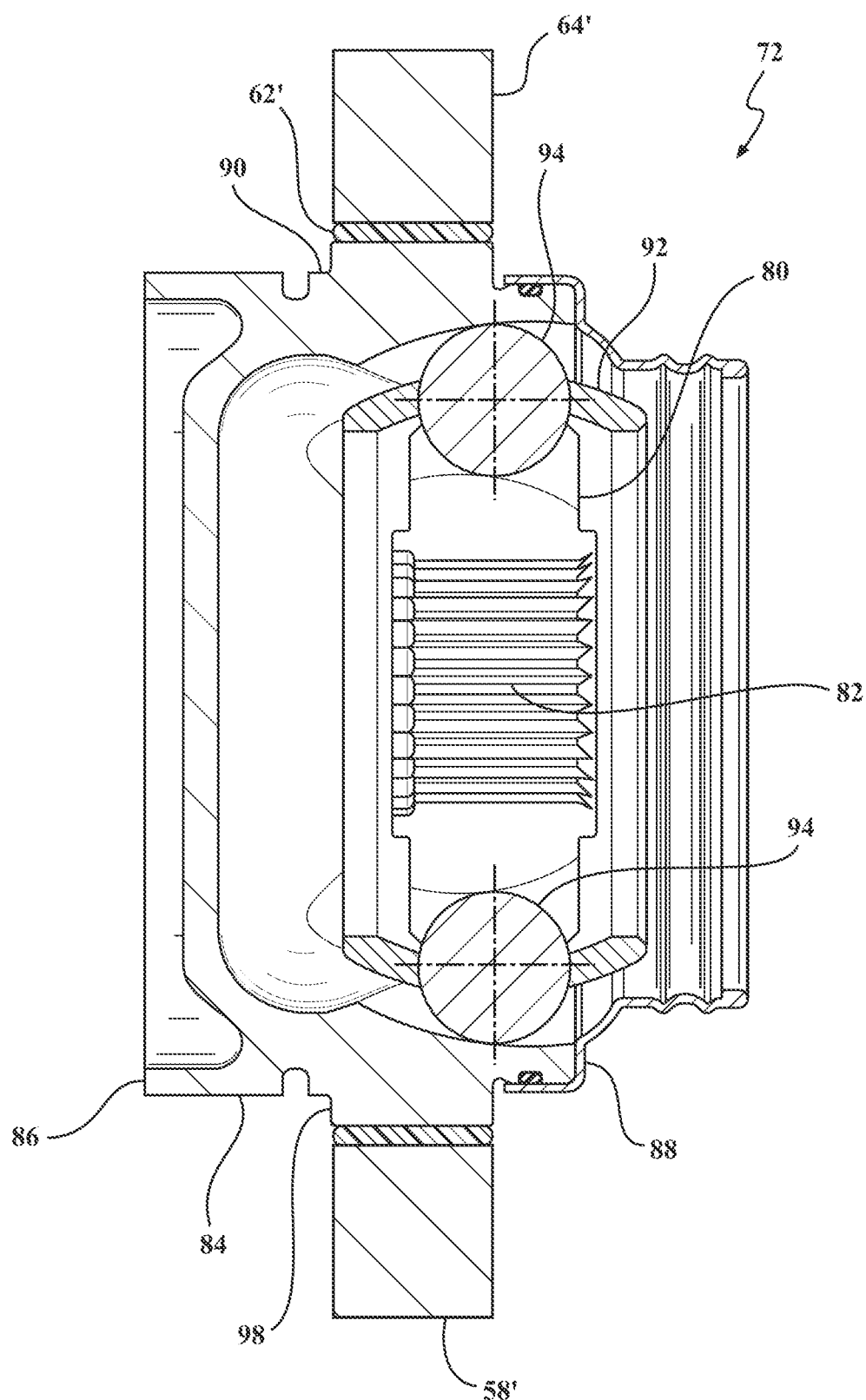
FIG. 12 is a cross-sectional view of the constant velocity joint.

As further illustrated in FIGS. 10-11, the constant velocity joint 72 includes an outer race 84 extending from a first outer race end 86 operably connected to the second shaft segment 16, such as via friction or laser welding, for rotation therewith to a second outer race end 88 to define an outer race exterior surface 90. As best illustrated in FIGS. 10 and 12, the constant velocity joint 72 further includes a cage 92 housing a plurality of balls 94 that are disposed between the inner and outer races 80, 84 for rotatably supporting the inner and outer races 80, 84 relative to one another and transmitting torque therebetween. A boot 96 extends from the second outer race end 88 to the CV shaft 74 for sealing the constant velocity joint 72, namely by retaining grease inside of the constant velocity joint 72 while keeping contaminants and foreign matter, such as dirt, water, and the like out of the constant velocity joint 72.

A tuned damper 58' extends radially outwardly from the outer race exterior surface 90 for reducing, cancelling or counteracting NVH generated during operation of the constant velocity joint 72, namely simultaneous rotation of the inner and outer races 80, 84 and their corresponding shaft segments 12, 16. In a preferred arrangement, the tuned damper 58' is installed on the rotating, outer race 84 by press fitting the tuned damper 58 on the outer race exterior surface 90. However, the tuned damper 58' can also be adhesively secured to the outer race exterior surface 90 without departing from the scope of the subject disclosure. The tuned damper 58' is disposed adjacent the second outer race end 88 and in spaced relationship with the first outer race end 86 to provide a portion of the outer race exterior surface 90 which remains exposed to facilitate attachment of the second shaft segment 16 to the outer race 84, such as via friction or laser welding.

Figure 13:
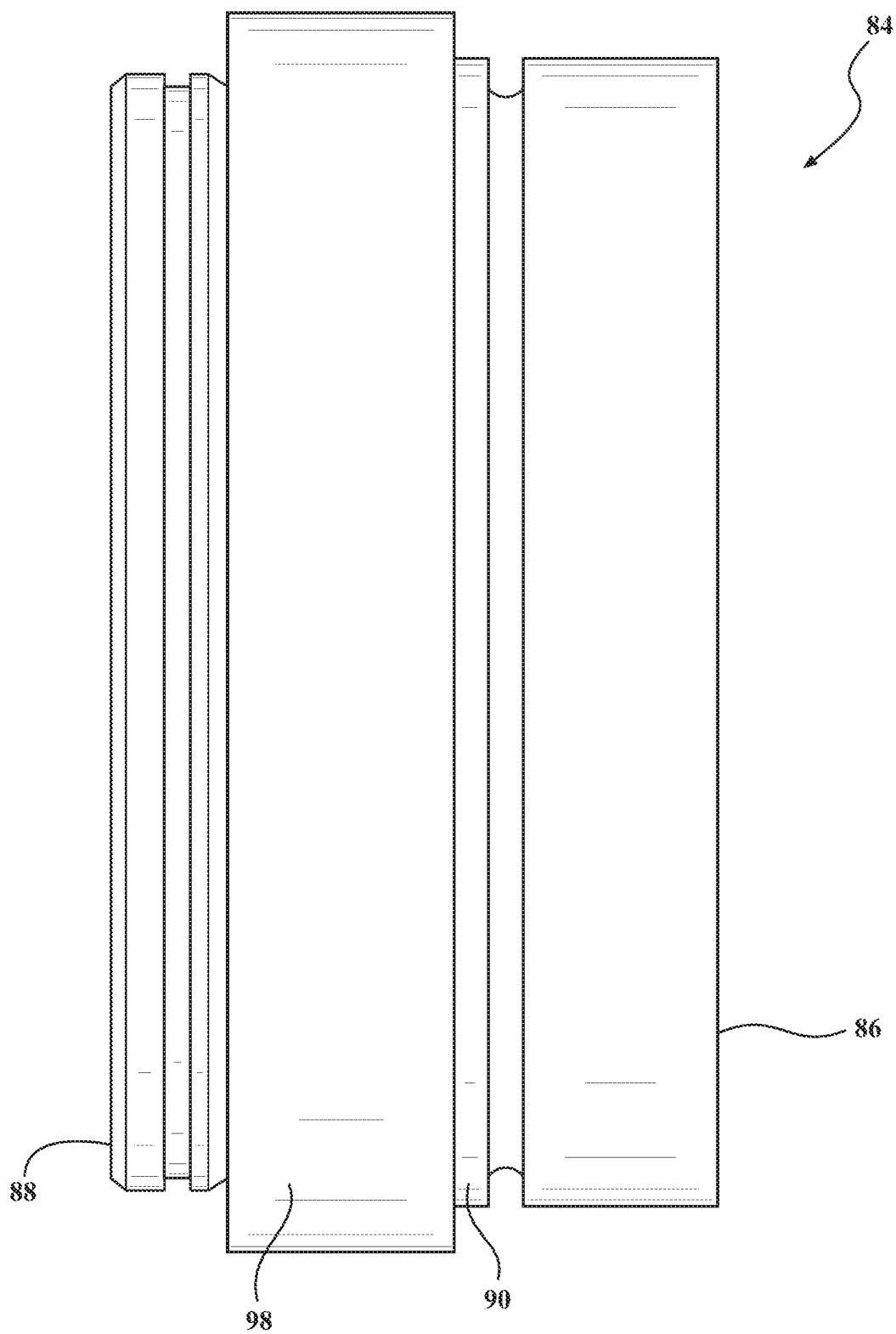
FIG. 13 is a side, perspective view of the outer race illustrating a raised, integral ring portion defined by the outer race exterior surface.

As best illustrated in FIGS. 12 and 13, the outer race exterior surface 90 defines a raised, integral ring portion 98 for placement of the tuned damper 58'. The tuned damper 58' also preferably includes a first damper ring 62' and a second damper ring 64'. The first damper ring 62' is disposed in encircling and abutting relationship with the raised, integral ring portion 98 of the outer race exterior surface 90 and is comprised of a flexible material, such as plastic, synthetic or natural rubber, or elastomer material. The second damper ring 64' is disposed in encircling and abutting relationship with the first damper ring 62' and is comprised of a lightweight steel or iron material. Due to the flexible configuration of the first damper ring 62', it may be disposed via an interference fit between the outer race exterior surface 90 and the second damper ring 64'. The size and weight of both the first damper ring 62' and the second damper ring 64' are selectively chosen based on the frequency of vibration present at the constant velocity joint 72 from the multi-piece propeller shaft 10. In other words, depending on the type, amount and/or magnitude of the offensive and/or unwanted NVH that is being reduced and/or cancelled, a mass and/or material of the first and second damper rings 62', 64' can be changed to correspond with the desired performance of the tuned damper 58'.

Obviously, many modifications and variations of the present invention are possible in light of the above teachings and may be practiced otherwise than as specifically described while within the scope of the appended claims. Individual elements or features of a particular embodiment are generally not limited to that particular embodiment, but, where applicable, are interchangeable and can be used in a selected embodiment, even if not specifically shown or described.

What is claimed is:

1. A constant velocity joint for a multi-piece propeller shaft comprising:
    an outer race extending from a first outer race end to a second outer race end to define an exterior surface;
    said exterior surface of said outer race including an integral raised ring portion disposed between said first and second outer race ends; and
    a tuned damper disposed on and extending radially outwardly from said integral raised ring portion of said exterior surface of said outer race for reducing noise, vibration, and/or harshness (NVH) generated during operation of the multi-piece propeller shaft.

2. The constant velocity joint as set forth in claim 1, wherein said tuned damper is disposed adjacent said second outer race end and in spaced relationship with said first outer race end to facilitate attachment of a shaft segment of the multi-piece propeller shaft to said first outer race end of said outer race.

3. The constant velocity joint as set forth in claim 1, wherein said tuned damper includes a first damper ring disposed in encircling and abutting relationship with said integral raised ring portion and a second damper ring disposed in encircling and abutting relationship with said first damper ring.

4. The constant velocity joint as set forth in claim 3, wherein said first damper ring is comprised of a flexible material and said second damper ring is comprised of steel or iron.

5. The constant velocity joint as set forth in claim 1, wherein said tuned damper is press-fit onto said integral raised ring portion of said exterior surface of said outer race.

6. The constant velocity joint as set forth in claim 1, further comprising:
    an inner race disposed within said outer race; and
    a cage housing a plurality of balls disposed between said inner and outer races and rotatably supporting said inner and outer races relative to one another for transmitting torque therebetween.

7. A multi-piece propeller shaft comprising:
    a first shaft segment and a second shaft segment;
    a constant velocity joint disposed between and operably interconnecting said first and second shaft segments;
    said constant velocity joint including an inner race operably interconnected with said first shaft segment;
    said constant velocity joint including an outer race operably interconnected with said second shaft segment;
    said outer race extending from a first outer race end interconnected to said second shaft segment to a second outer race end to define an exterior surface;
    said exterior surface of said outer race including an integral raised ring portion disposed between said first and second outer race ends; and
    a tuned damper disposed on and extending radially outwardly from said integral raised ring portion of said exterior surface of said outer race for reducing noise, vibration, and/or harshness (NVH) generated during operation of the multi-piece propeller shaft.

8. The multi-piece propeller shaft as set forth in claim 7, wherein said tuned damper is disposed adjacent said second outer race end and in spaced relationship with said first outer race end to facilitate attachment of said second shaft segment to said outer race.

9. The multi-piece propeller shaft as set forth in claim 7, wherein said tuned damper includes a first damper ring disposed in encircling and abutting relationship with said integral raised ring portion of said exterior surface and a second damper ring disposed in encircling and abutting relationship with said first damper ring.

10. The multi-piece propeller as set forth in claim 9, wherein said first damper ring is comprised of a flexible material and said second damper ring is comprised of steel or iron.

11. The multi-piece propeller shaft as set forth in claim 7, wherein said tuned damper is press-fit onto said integral raised ring portion of said exterior surface.

12. The multi-piece propeller shaft as set forth in claim 7 further comprising a cage housing a plurality of balls disposed between said inner and outer races and rotatably supporting said inner and outer races relative to one another for transmitting torque therebetween.

* * * * *